(No Model.) 5 Sheets—Sheet 3.
W. MERRILL.
KEY SEAT CUTTING MACHINE.
No. 589,010. Patented Aug. 31, 1897.
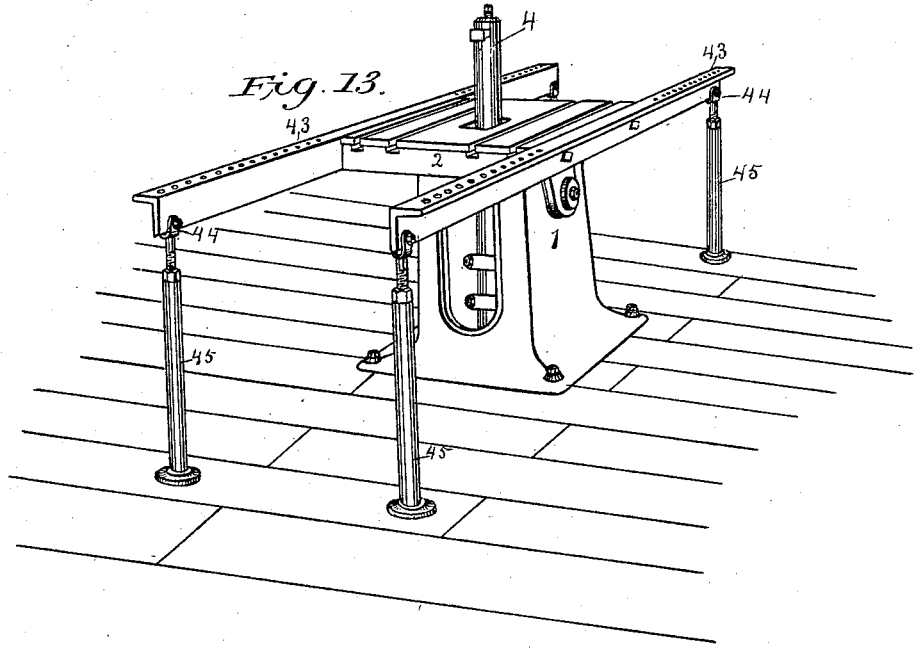
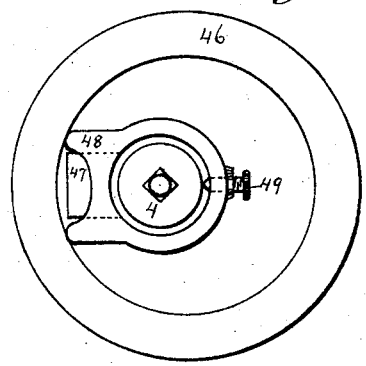
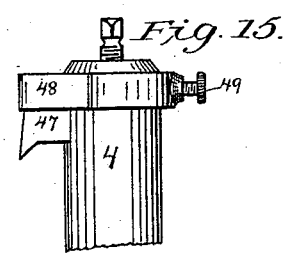
WITNESSES
Wm J. Winston
N. Davidson
INVENTOR
William Merrill (No Model.) 5 Sheets—Sheet 4.

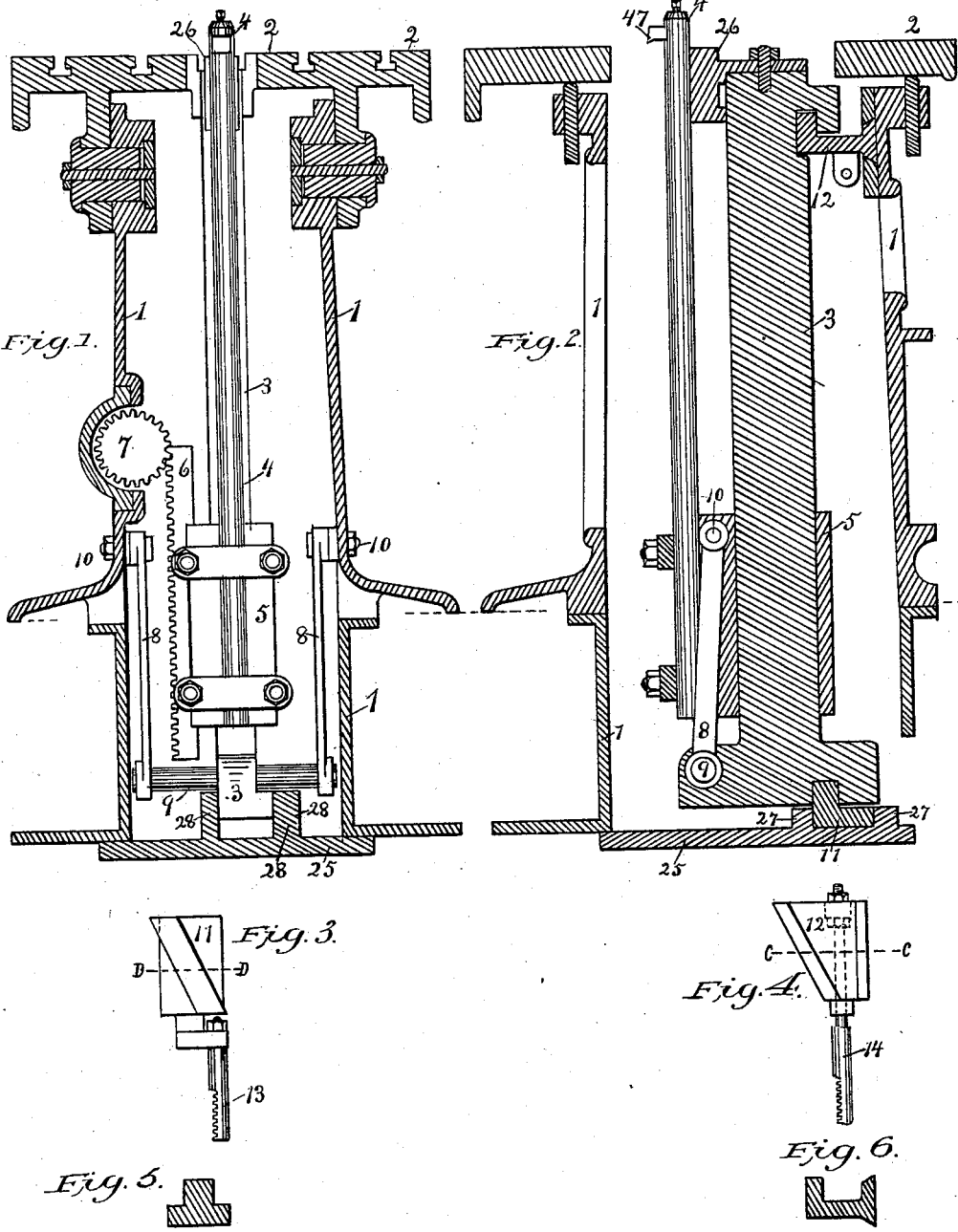

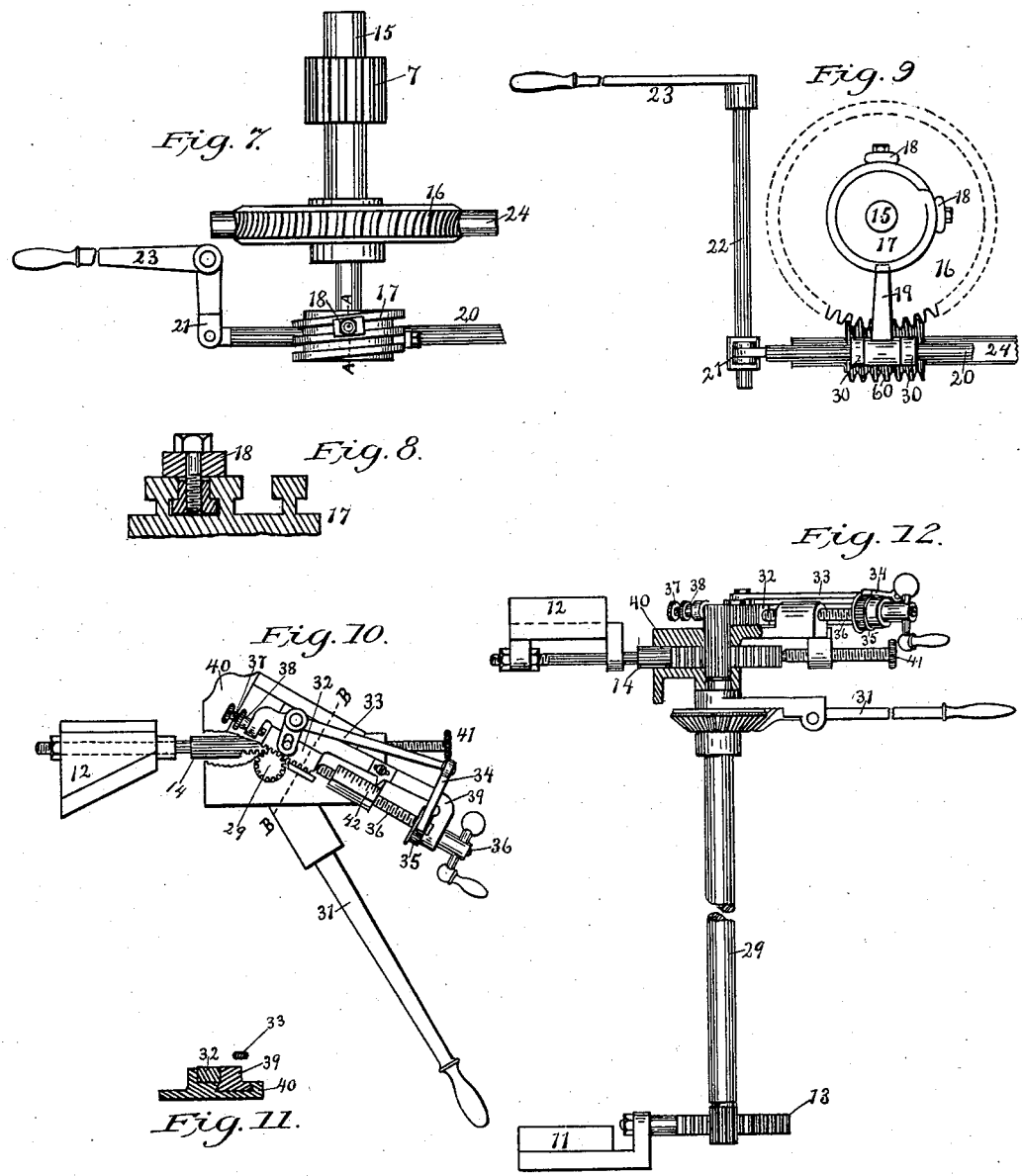

W. MERRILL.
KEY SEAT CUTTING MACHINE.

No. 589,010. Patented Aug. 31, 1897.

WITNESSES
Wm J. Winston
N. Davidson

INVENTOR
William Merrill (No Model.)  5 Sheets—Sheet 5.

W. MERRILL.
KEY SEAT CUTTING MACHINE.

No. 589,010.  Patented Aug. 31, 1897.

WITNESSES
Wm. J. Winston
N. Davidson

INVENTOR
William Merrill

UNITED STATES PATENT OFFICE.

WILLIAM MERRILL, OF SAGINAW, MICHIGAN, ASSIGNOR OF ONE-HALF TO SYLVANIS S. MITTS, OF SAME PLACE.

KEY-SEAT-CUTTING MACHINE.

SPECIFICATION forming part of Letters Patent No. 589,010, dated August 31, 1897.

Application filed February 23, 1895. Serial No. 539,425. (No model.)

*To all whom it may concern:*

Be it known that I, WILLIAM MERRILL, a citizen of the United States, residing at Saginaw, county of Saginaw, State of Michigan, have invented new and useful Improvements in Key-Seat-Cutting Machines, of which the following is a specification.

My invention relates more particularly to improvements in key-seat-cutting machines similar to the one upon which United States Letters Patent were issued September 11, 1888, No. 389,243.

The objects of my improvements are, first, to provide a new form of guide-bar with mechanism for supporting and moving the same; second, to provide an improved form of mechanism for stopping and starting the machine and shifting the length of stroke; third, to provide mechanism for obtaining an automatic feed; fourth, to provide an improved form of extension-bars for supporting the work; fifth, to provide an improved device for centering the work; sixth, to provide improved forms of mechanism for supporting the tool-bar.

These several improvements are more fully hereinafter described, are specifically set forth in the claims, and are illustrated by the mechanism shown in the accompanying drawings.

Figures 1 and 2 are front and side elevations, partly sectional, of the main portion of the machine, showing how the guide-bar is supported and moved. Figs. 3 and 4 are elevations, and Figs. 5 and 6 cross-sections, of the feed-wedges which move the guide-bar. Fig. 7 is a plan, and Fig. 9 an elevation, representing shaft 15 with tappet-hub 17 and other parts used to stop and start and shift the length of stroke of the machine. Fig. 8 is a cross-section through a portion of the tappet-hub 17 and tappet 18 on the line A A, Fig. 7. Fig. 10 is a plan, and Fig. 12 is an elevation, to illustrate the automatic-feed mechanism. Fig. 11 is a cross-section through a portion of Fig. 10 on the line B B. Fig. 13 is a perspective view showing the extension-arms supported by jack-screws. Fig. 14 is a plan, and Fig. 15 an elevation, representing a device for centering the piece to be key-seated. Figs. 16, 17, 18, and 19 are views representing one form of mechanism for supporting the tool-bar against the cutting pressure. Figs. 20, 21, 22, and 23 are views representing another form of mechanism for supporting the tool-bar.

Throughout all the views the same reference-numbers refer to the same parts of the machine.

To a suitable supporting-column 1 is pivotally attached a table 2, and the base-plate 25 laterally supports, by suitable projections, the upper and lower ends of the guide-bar 3. Sliding on the guide-bar is a cross-head 5, actuated by the rack 6 and pinion 7. To the cross-head 5 is suitably clamped a tool-bar 4, which is supported at the upper end of the guide-bar by the back support 26. Attached to the column by bolts 10 are swinging hangers 8, supporting, by means of the rod 9, the weight of the guide-bar 3. The object of thus supporting the guide-bar is to avoid the excessive sliding friction due to its weight, which exists when the hangers 8 are omitted.

The wedge 11, of which Fig. 5 is a cross-section on the line D D, Fig. 3, is guided by its lower portion between suitable upward projections 27 of the base-plate 25. The upper portion of the wedge 11, being oblique to the lower portion, engages in a suitable recess in the lower end of the guide-bar 3, whereby as the lower wedge 11 is moved laterally across the base-plate 25 the guide-bar 3, being held laterally, is moved forward and backward between the projections 28 on the base-plate 25. Similarly the upper end of the guide-bar 3 is moved by the wedge 12, of which Fig. 6 is a cross-section on the line C C, Fig. 4, one portion of the wedge 12 sliding in a suitably-formed recess in the column 1, the other portion engaging in a suitable angular recess in the guide-bar 3. The parts 11 and 12 are moved simultaneously to an equal extent by means of the racks 13 and 14 and the shaft 29. (Shown in Fig. 12.) The oblique portions of 11 and 12 are formed to the same angle, so as to move equally both ends of the guide-bar 3. In former constructions the guide-bar was moved in one direction by the wedge against springs, the springs operating to move it in the other direction. The action of the springs was unequal and uneven and the resistance excessive, which faults are overcome by this improvement.

In Figs. 7 and 9 the worm-wheel 16 and pinion 7 are actuated by the worm-screw 60 on the shaft 24. This shaft may be extended to any suitable length, and on it may be placed suitable friction-clutch pulleys to drive the shaft 24 in either direction. To operate the friction-clutch, the rod 20 may be extended and provided with suitable connections in the ordinary manner common to other machine-tools. On the shaft 15 is placed a hub 17, in the periphery of which is formed a T-shaped helical groove in which are the movable tappets 18. (Shown also in Fig. 8.) In operation the part 19, which may be loose on the rod 20, but prevented from moving endwise on it by the collars 30, has its upper end engaging in the groove formed in the hub 17 and is actuated by each of the tappets 18 alternately. The tappets may be shifted to change the length of stroke, and by means of the levers 21 and 23 on the rod 22, which may be suitably attached to the column, the operator may by hand control and stop or start the machine. To allow the cross-head 5 to move to the full extent of the stroke, the pinion 7 must make more than one revolution. Consequently the hub 17 must have a helical groove extending around it more than one revolution to admit of the required amount of motion between the tappets. The former construction, as shown in the patent above cited, was quite different, since it does not shift the belts properly at all speeds and fails to afford uniform, definite lengths of stroke, which objections my improvement overcomes.

In Figs. 10, 11, and 12, which illustrate the mechanism for feeding the tool, the shaft 29, having each end formed into a pinion by engaging with the racks 13 and 14, moves the wedges 11 and 12, thereby moving the guide-bar 3, as previously explained. In operating the machine, in order to relieve the tool from dragging on the work in its upward stroke, and thus becoming dull or broken, it is necessary, by means of the lever 31, to so move the wedges and guide-bar as to draw back the tool-bar 4. Then at the beginning of the downstroke the lever 31 is moved in the opposite direction and the tool begins to cut. The lever 31 is limited in its motion by means of the feed-rack 32, which engages in the upper end of the pinion on the shaft 29. The rack 32 can move only between the ends of the feed-screw 36 and the adjusting-screw 37. The amount of motion is regulated by the screw 37, which is fastened by the lock-nut 38. If at each stroke of the machine the screw 36 is drawn out slightly away from the rack 32, it allows the shaft 29 to turn farther, and thus move the wedges 11 and 12 slightly farther at each stroke to give the required amount of feed. This motion of the feed-screw 36 can be and formerly was done by hand. To rotate it automatically also, which is one of the objects of my invention, I put on the feed-screw 36 the ratchet-wheel 35, operated by the pawl 34 and the lever 33, which is moved by the slight motion of the rack 32. At the beginning of the upward stroke, when the lever 31 is moved to the right to relieve the tool from dragging, the rack 32 moves to the left until it strikes the screw 37, at the same time moving the lever 33 and turning the ratchet 35, so that the screw 36 moves to the right. At the beginning of the downstroke, when the lever 31 is reversed, the rack 32 moves to the right until stopped by the screw 36. The amount of motion of the screw 36, and the consequent depth of the cut at each stroke, is regulated by the amount of motion of the rack 32, which in turn is regulated by the screw 37. As formerly done, when the screw 36 was moved only by hand the feed would be irregular and the capacity of the machine decreased. My improvement increases the capacity of the machine by allowing the feed to be adjusted to the greatest possible amount and kept uniform at each stroke. The arm 39 slides in a recess in the supporting-casting 40 and supports the outer end of the screw 36, and also supports the lever 33, all these parts moving together as the tool-bar and guide-bar are moved.

The amount of motion and the depth of the key-seat is indicated by a pointer and graduated scale 42. When it is necessary to cut many key-seats to the same depth, after the first one is cut to the proper depth the stop-screw 41 is screwed up against the end of the rack 14. Then all the other key-seats will be cut to the same depth, when the rack 14 is stopped by the screw 41.

In Fig. 13 are represented the extension-bars 43, which preferably are made of ordinary steel angle-bars, which may be suitably fastened to the sides of the table 2. When heavy pieces of large diameter are placed upon the extension-bars, it is necessary to support their outer ends by the jack-screws 45, which are pivotally connected by the joints 44 to the extension-bars 43. In the top of the extension-bars are holes for the reception of bolts to fasten the piece being operated upon. This construction is one of great strength, and is simple and effective and easily attached. As heretofore made these extension-arms have been bracket-shaped castings bolted by their short arms to the front and back ends of the table, which construction was much weaker and more expensive.

In Fig. 14, 46 represents a ring in which a key-seat is to be cut, 4 is the tool-bar, 47 is the tool, and 48 is a suitably-shaped piece bored to fit the upper end of the tool-bar, to which it is fastened by the screw 49, the point of which enters a suitable depression in the tool-bar 4. If the tool 47 is quite wide, it would only be necessary to push the piece 46 up against it until both corners of 47 touch against the inner circle of 46, but as the tool 47 is frequently quite narrow this method would not be sufficiently accurate, so the piece 48 has its two ends so fitted that when the circular opening in any piece in which the key-seat is to be cut is placed against them the key-seat will be cut centrally in a proper manner. As formerly made, pins or pieces corresponding in use to the two ends of the centering device 48 were attached to the table 2 before the work was placed on it. This is often very inconvenient, as the workman forgets to attach the device until the work is on the table and then must remove the work in order to attach it.

When it is necessary to cut a key-seat in a long hole of small diameter in which a small tool-bar must be used, the tool-bar is too light to prevent the tool from springing back away from the cut at the upper end of the key-seat, thus causing much trouble and doing poor work. To overcome this objection, I have invented the devices shown in Figs. 16 to 23, inclusive, in which 50 represents a section of a portion of the piece in which a key-seat is to be cut. At the back of the tool-bar 4 is a back support 26, attached to the top of the guide-bar 3.

53 represents Babbitt metal or other suitable material formed about a portion of the guide-bar and inside of the piece 26. Into 53 is inserted a bar 51, which also enters into a groove formed in the back of the tool-bar 4.

51 is stationary while the tool-bar moves vertically. At the back of, and partially embracing the bar 51, is a piece 52, having formed on its side farthest from the tool-bar one or more wedge-shaped surfaces. Back of 52 is a piece 59, having corresponding but reversed wedge-shaped surfaces, the piece 59 resting against the side of the hole opposite to that in which the key-seat is to be cut, and being prevented from falling by the attached hook-piece 58, which rests on the top of 50. In the dovetailed groove in the side of the rod 51 is placed a strip 54, being adjustably secured by the screw 55. Pivotally attached to the top of the tool-bar is the dog 56, which is held by the spring 57 to engage in the teeth of the ratchet 61, formed in a portion of the piece 52.

Figure 16:
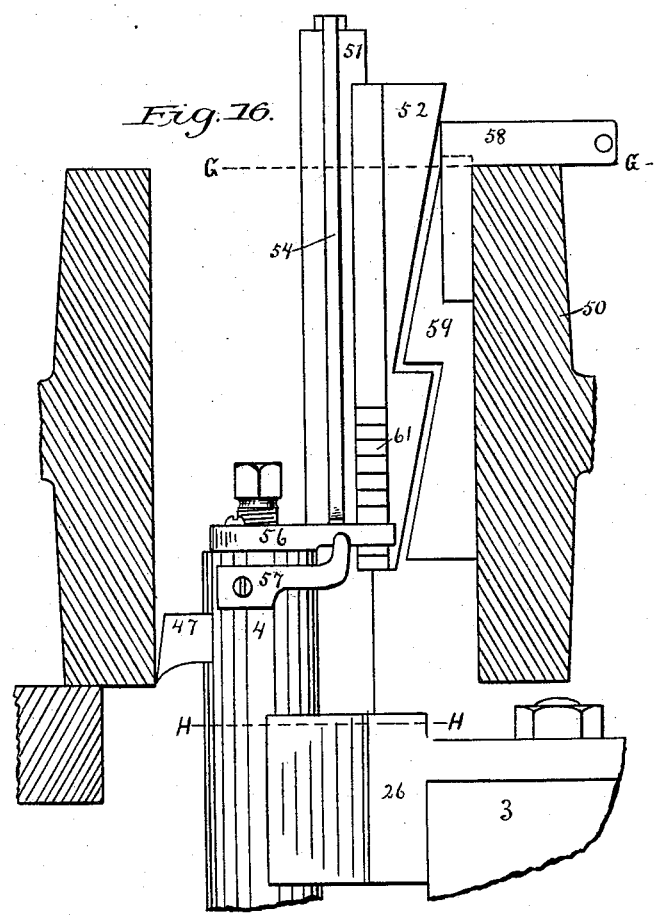
Figure 17:
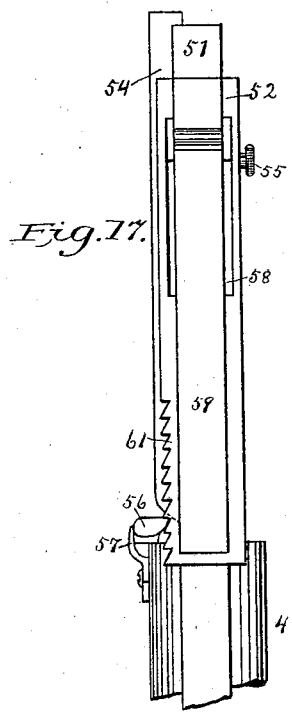
Figure 18:
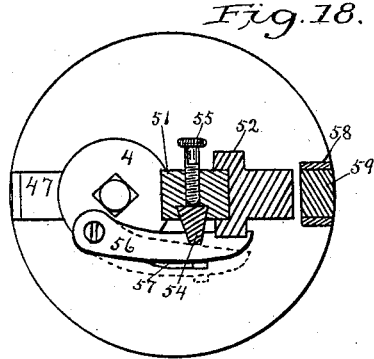
Fig. 18 represents a cross-section on the line G G, Fig. 16, showing also the upper end of the tool-bar and parts attached.
Figure 19:
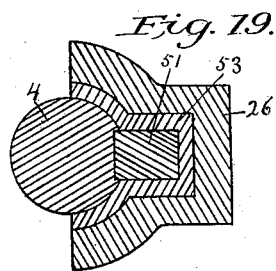
Fig. 19 represents cross-section on the line H H, Fig. 16.

The operation is as follows: In the position of the parts as shown, the tool has moved upward a short distance in its stroke, and the dog 56 has lifted the wedge 52 away from the opposite wedge 59, so that the tool-bar 4 is free to move away from the key-seat. As the tool-bar continues its upward motion, the dog 56 is met by the inclined end of the strip 54, which releases 56 from the ratchet 61 and wedge 52. The dog 56 is thus held away by the strip 54 throughout the remainder of the upward stroke. At the beginning of the downstroke, when the tool-bar 4 is moved forward toward the key-seat to take the next chip, the wedge 52 is released and falls sufficiently to fill the space between the rod 51 and the back wedge 59, thus forming a perfectly solid backing or support for the tool-bar 4 wholly within the hole of the piece which is being key-seated. As the tool-bar continues its downstroke the dog 56 passes over the ratchet 61, and at the termination of the downstroke it engages with the ratchet ready for the next upstroke. The strip 54 and the piece 52 are made of suitable length to engage with the dog 56 when the tool is at the lowest and highest points of its stroke. This action is automatic. The piece 52 can have any number of wedge-surfaces depending on the length of stroke. When the hole is large in which the key-seat is to be cut, an extra piece can be inserted back of 59 to fill the space, and this piece can be made tapering to conform to the taper of the key-seat, the hub being set to the proper taper by tilting the table 2.

Figure 20:
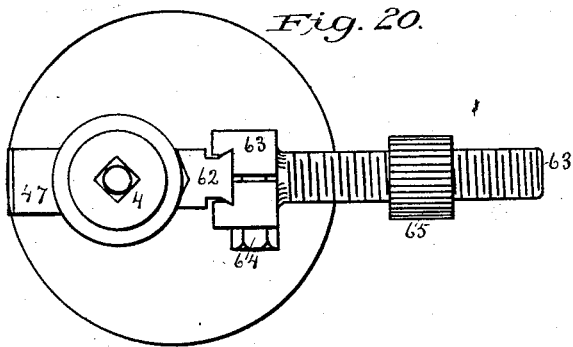
Figure 21:
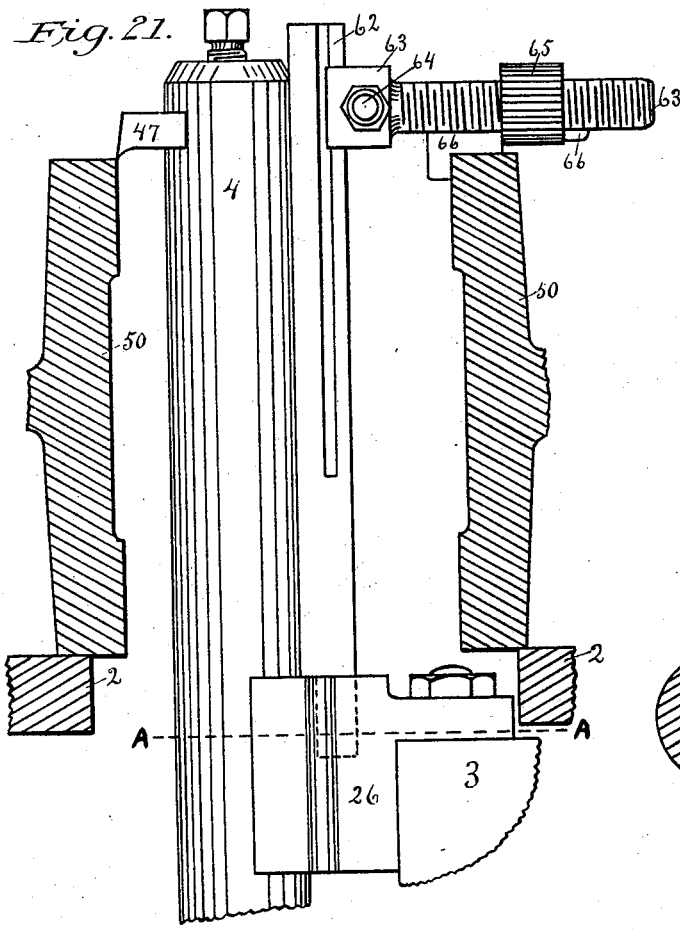
Figure 22:
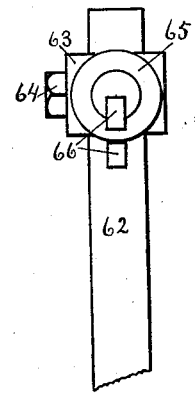
Figure 23:
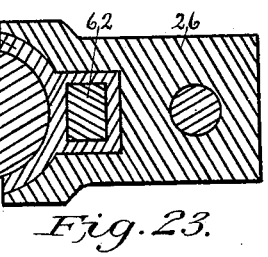

Another form of back support, more simple and not automatic, is shown in Figs. 20 to 23, inclusive, in which the hub 50 may be fastened to the table 2. Back of the cutter-bar 4 is a support 26. The supporting-bar 62 is inserted into 53, which may be of Babbitt metal or other suitable material. The upper portion of the bar 62 has a dovetail formed in it, as shown in Fig. 20. Adjustably fastened to 62 by the bolt 64 is a screw-bar 63. On the screw-bar 63 is a nut 65, into which is locked a sliding hook 66, the screw-bar 63 being grooved to receive it. By moving the nut 65 the sliding hook 66 is also moved.

In operation the supporting-bar 62 may be put in place before beginning to cut the key-seat or when it is nearly finished, the screw-bar 63 being adjusted and clamped at the proper height to engage 66 with the hub 50. In that position the workman can by moving the nut 65 press forward the supporting-bar 62, and thereby hold the tool 47 firmly into cut. Usually it is only necessary to do this when the key-seat is very long, and it is ordinarily used only to make the last two or three cuts necessary to finish the key-seat.

Having thus described my invention, what I claim as new, and desire to secure by Letters Patent, is—

1. In a key-seating machine having a reciprocating tool-bar, the combination of the table 2, the perforated extension-bars 43, and jack-screws 45, pivotally attached to the extension-bars, substantially as described.

2. In a key-seat-cutting machine the combination of a shaft 29 operating racks 13, and 14 and feed-rack 32, the feed-screw 36 and an adjusting-screw 38, arranged substantially as, and for the purpose set forth.

3. In a key-seat-cutting machine, as a device for centering the work, the combination of a tool-bar having an inserted cutter, and, attached to the tool-bar, a collar having two projecting end portions, the extreme points of which are equidistant from the center of the tool-bar, and also equidistant from the center of the cutter, substantially as and for the purpose set forth.

4. In a key-seat-cutting machine, the combination of a tool-bar, a supporting-bar back of the tool-bar, a movable wedge and a stationary wedge, with a suitable device for operating the movable wedge automatically, substantially as and for the purpose set forth.

5. In a key-seat-cutting machine, a tool-bar in combination with a supporting-bar, a screw adjustably secured to the supporting-bar, and an adjustable hook attached to the screw, substantially as and for the purpose set forth.

6. In a key-seating machine of the class described the combination of the vertical guide-bar 3, the upper and lower wedges 12 and 11 adapted to moving the guide-bar horizontally in both directions, and the vertical hangers 8 to suspend the guide-bar and relieve it of the friction due to gravity, substantially as described.

WILLIAM MERRILL.

Witnesses:
N. DAVIDSON,
T. RANDALL.